United States Patent [19]
Richtzenhain et al.

[11] 3,878,256
[45] Apr. 15, 1975

[54] STABILIZATION OF 1,1,1-TRICHLOROETHANE WITH A FOUR COMPONENT SYSTEM

[75] Inventors: Hermann Richtzenhain, Munich-Schwellenbach; Rudolf Stephan, Troisdorf-Sieglar, both of Germany

[73] Assignee: Dynamit Nobel AG, Troisdorf, Germany

[22] Filed: Jan. 17, 1973

[21] Appl. No.: 324,256

Related U.S. Application Data

[60] Continuation-in-part of Ser. No. 60,173, June 29, 1970, Pat. No. 3,787,509, which is a division of Ser. No. 805,923, Jan. 5, 1969, Pat. No. 3,590,088, which is a division of Ser. No. 609,681, Jan. 16, 1967, Pat. No. 3,445,532, which is a continuation of Ser. No. 316,772, Oct. 16, 1963, abandoned.

[30] Foreign Application Priority Data

Oct. 18, 1962 German.............................40087

[52] U.S. Cl........... 260/652.5 R; 252/170; 252/171; 252/364; 252/405; 252/407
[51] Int. Cl.............................................. C07c 17/40
[58] Field of Search ............................ 260/625.5 R

[56] References Cited
UNITED STATES PATENTS

| | | | |
|---|---|---|---|
| 3,049,571 | 8/1962 | Brown...................... | 260/652.5 R X |
| 3,445,532 | 5/1969 | Richtzenheim et al. ...... | 260/652.5 R |
| 3,565,811 | 2/1971 | McDonald ................... | 260/652.5 R |

FOREIGN PATENTS OR APPLICATIONS

| | | | |
|---|---|---|---|
| 1,197,068 | 7/1965 | Germany...................... | 260/652.5 R |

*Primary Examiner*—Howard T. Mars
*Attorney, Agent, or Firm*—Burgess, Dinklage & Sprung

[57] ABSTRACT

A 1,1,1-trichloroethane stabilzing composition comprising an alcohol or 1,2 epoxy butane, at least one organic compound containing at least one nitrile group, 1,4-dioxane and nitromethane. Preferably the nitrile is Δ-methoxy acetonitrile and the alcohol is tertiary butanol.

3 Claims, No Drawings

STABILIZATION OF 1,1,1-TRICHLOROETHANE WITH A FOUR COMPONENT SYSTEM

CROSS-REFERENCE TO RELATED APPLICATIONS

This application is a continuation-in-part of application Ser. No. 60,173 of June 29, 1970, now U.S. Pat. No. 3,787,509 which, in turn, is a divisional application of Ser. No. 805,923 of Jan. 5, 1969, now U.S. Pat. No. 3,590,088 which, in turn, is a divisional application of Ser. No. 609,681 of Jan. 16, 1967, now U.S. Pat. No. 3,445,532 which, in turn, is a continuation of Ser. No. 316,772 of Oct. 16, 1963, and now abandoned.

BACKGROUND OF THE INVENTION

1. Field of the Invention

This invention relates to new and valuable 1,1,1-trichloroethane stabilizer compositions comprising a four component system containing an organic compound having at least one nitrile group, an alcohol such as tertiary butanol, or alternatively 1,2-epoxy butane, 1,4-dioxane, and nitromethane. The invention is also directed to 1,1,1-trichloroethane compositions containing the four component system as a stabilizer therefor. The invention is particularly directed to the problem of minimizing the marked tendency of 1,1,1-trichloroethane to undergo decomposition. Thus the present invention is particularly directed to minimizing the tendency to this decomposition which occurs especially in the presence of metals.

2. Discussion of Prior Art

It is well known that halogen hydrocarbons, such as vinyl chloride, vinylidene chloride, trichloroethane, trichloroethylene, perchloroethylene, and other aliphatic chlorinated hydrocarbons very easily undergo decomposition. This decomposition generally takes place with the simultaneous formation of acids and is caused, among other things, by the presence of light, air, or traces of water. It is furthermore known that the splitting off of acid is greatly promoted by the presence of certain metals. Thus, for example, the decomposition reaction is catalyzed by iron, aluminum, magnesium, and the alloys of such metals.

The decomposition reaction can be so violent in the case of some of these compounds, that the further use and processing of these halogen hydrocarbons in metal vessels is possible only with the greatest of difficulty if at all. As noted above, light serves to promote the decomposition further complicating further use and processing of the halogen hydrocarbons.

This defect is especially marked in the case of 1,1,1-trichloroethane, 1,1,1-trichloroethane being more inclined to split off hydrochloric acid and then blacken than any of the above-named chlorinated hydrocarbons. The decomposition reaction can progress to the complete resinification of the material and accordingly the usefulness of 1,1,1-trichloroethane per se is severely limited. For industrial use, 1,1,1-trichloroethane is employed only together with an added stabilizer.

The stabilization of 1,1,1-trichloroethane has heretofore been effected using for the stabilization dialkylsulfoxides, dialkylsulfites, dialkylsulfides, 1,4-dioxanes, epoxides, monoketones, trialkylsilylethers, tetralkyl compounds of tin and lead, nitroalkanes, sec. or tert. alcohols, nitriles, acetylene alcohols, oxazirines, thiazirines, oxaphosphorines, and thiaphosphirines. These known stabilizing agents must usually be used in large quantities in order that there results an adequate stabilizing effect, so that the 1,1,1-trichloroethane thus stabilized takes on the character of a mixture of solvents. The stabilizer-1,1,1-trichloroethane mixtures so characterized are suitable only for a limited field of application. Furthermore the use of dioxane and a number of the other conventionally employed stabilizing compounds is furthermore undesirable from the standpoint of useful applications because of their toxicity. Certain of the conventionally used stabilizers set out above have also proved undesirable due to the color which they impart to the 1,1,1-trichloroethane while others are entirely unsuitable due to their great chemical reactivity with the agents to be treated, whereby they are used up in the reaction and the stabilizing effect produced gradually lost, decomposition thereupon setting in. Still another group of the known stabilizers is characterized by the group's great sensitivity to hydrolysis in oxygen and therefore this group finds only limited application.

OBJECTS OF THE INVENTION

It is one of the objects of the present invention to provide new and valuable compositions which have proved of value in the stabilization of 1,1,1-trichloroethane.

Another object of the present invention is to provide a simple and effective procedure of stabilizing 1,1,1-trichloroethane.

A further object of the present invention is to provide stabilized 1,1,1-trichloroethane containing such stabilizing compositions and especially 1,1,1-trichloroethane stabilized by a mixture of an organic compound containing at least one nitrile group, 1,4-dioxane, nitromethane, and 1,2-epoxy butane.

Other objects of the present invention and advantageous features thereof will become apparent from the following description and claims.

SUMMARY OF THE INVENTION

It has been found that the stabilization of 1,1,1-trichloroethane is obtained by incorporation in the 1,1,1-trichloroethane of a mixture of an organic compound having at least one nitrile group, 1,4-dioxane, nitromethane, and 1,2-epoxy butane, or an alcohol, especially tertiary butanol. The stabilizing effect is achieved by the addition to the 1,1,1-trichloroethane of a mixture of an organic compound having at least one nitrile group, 1,4-dioxane, nitromethane and 1,2-epoxy butane; however, it has been further found that additional improvements in the stabilization effect can be achieved by using as stabilizer a combination of the organic nitrile with the three stabilizing agents.

Instances of nitriles suitable as components for the stabilizing mixture include for example: acetonitrile, methoxy acetonitrile, propionitrile, acrylonitrile, β-methoxypropionitrile, dimethylaminoacetonitrile, methylaminopropionitrile, methyleneaminoacetonitrile, dimethylaminopropionitrile, diethylaminoacetonitrile, methylethylaminoacetonitrile, malodinitrile, and thiodipropionitrile, as well as the mono- and poly- cyanethylated products of acetone, methylethylketone and acetic acid ester.

As alcohol components for the stabilizing mixture, there may be used the saturated and unsaturated primary, secondary, and tertiary alcohols, preferably having up to five carbon atoms per OH group, as for example methanol, ethanol, n-propanol, n-butanol, tert. butanol, allyl alcohol, and propargyl alcohol. However, ketone alcohols, such as for example 4-hydroxybutanone-(2) or 5-hydroxy-pentanone-(3) and the products of the condensation of $C_1$ to $C_3$ amines with formaldehyde or acetaldehyde can be satisfactorily combined with the nitriles to stabilize methyl chloroform. Of the foregoing tertiary butanol is particularly preferred.

The stabilizer compositions of the present invention are employed in quantities of about 0.05 to 10 weight percent but preferably in quantities of 0.2 to 1 weight percent. An addition of 0.5 weight percent of stabilizing composition produces a stabilization of methyl chloroform that is adequate for most practical requirements.

In the preparation of the stabilizing compositions, the amounts of nitrile, nitromethane, 1,4-dioxane and alcohol or 1,2-epoxy butane are generally employed in equivalent amounts. However, it is also possible to prepare the stabilizing mixture with more or less of the nitrile compound being present in relation to the other components, both types of components are, however, required to be present in order to obtain the desired degree of stabilization. Generally ratios in the following broad and preferred ranges are suitable:

| Component | Broad Range | Preferred Range |
|---|---|---|
| Nitrile | 0,01 to 5,0 | 0,5 to 3,0 |
| Nitromethane | 0,01 to 2,5 | 0,3 to 2,0 |
| 1,4-dioxane | 0,01 to 4,0 | 0,5 to 3,0 |
| Alcohol or | | |
| 1,2-epoxy butane | 0,01 to 8,0 | 1,0 to 4,0 |
| | or 2,0 | or 0,2 to 1,0 |

The method of the invention for stabilizing 1,1,1-trichloroethane is especially advantageous in that the above described stabilizer compositions are considerably more effective than any one of the single components by itself in comparable concentration, as a result of which it is possible to stabilize methyl chloroform with substantially smaller amounts of stabilizer for most general applications.

The effectiveness of any of the stabilizer compositions for a specific purpose can be determined, for example, by simply boiling a specific amount of 1,1,1-trichloroethane with identical percentages of combinations to be evaluated in the presence of a specific amount of a metal powder, granules or chips.

The stabilizer compositions of the present invention can be added in the various stages of the manufacturing process of 1,1,1-trichloroethane. In certain instances the presence of the stabilizing compounds may be especially desirable in the gaseous phase, as for example in the distillation thereof.

The following examples serve to illustrate the present invention without, however, limiting the same thereto.

In the following table the effect of the quadricombination as per the invention (examples a and b) was compared with the effect of mixtures made of two or three substances from this combination (examples e to g). The total quantities used were almost equivalent so that by means of a comparison the synergistic effect of the combination as per the invention became clearly perceptible. Those tests which led to the result of this table were conducted anologously to the US-MILITARY SPECIFICATION MIL-T-7003, the test of which will be described in the following:

Each time two metal strips of the metal listed in the table were by polishing relieved from the oxide film, and respectively thus prepared that a metallicly pure active surface resulted. 200 ml of the stabilized 1,1,1-trichloroethane and one of the two metal strips were led into a flask with an attached reflux condenser. The second metal strip was thus applied into the vapour area of the solvent that most of the solvent condensate flew back from the condenser via this metal strip so that conditions arose which can be compared with those of a metal cleaning in the vapour phase. The solvent was heated by means of a 150 watt lamp and boiled under backflow within the period indicated in the table. Besides, via a dosing valve water saturated oxygen was led into the solvent (about 12 bubbles per minute). The judgement of this test on one hand covered the exterior appearance of the metal as regards a corrosive attack and on the other hand the discolouration and the turbidity of the 1,1,1-trichloroethane.

Concentration of the Stabilizers(weight %)

| | a) | b) | c) | d) | e) | f) | g) |
|---|---|---|---|---|---|---|---|
| methoxy acetone nitrile | 0,5 | 0,5 | — | — | — | — | — |
| 1,2-epoxy butane | 0,8 | 1,0 | 0,8 | 1,0 | 0,4 | — | — |
| 1,4-dioxane | 2,0 | — | 2,0 | — | 3,5 | 2,0 | 2,0 |
| nitro methane | 1,0 | 0,5 | 1,0 | 0,5 | 0,4 | 1,0 | — |
| tert. butanol | — | 2,0 | — | 2,0 | — | — | 2,0 |
| reaction time (h) | 168 | 144 | 168 | 144 | 144 | 168 | 144 |
| judgement according to the test run: | | | | | | | |
| colour of 1,1,1-trichloroethane | colourless clear | colourless clear | strong yellow | yellow clear | yellowish(only clear with Fe) | yellow turbid | yellowish |
| state of Fe-strip | + | + | — | — | — | — | — |
| of Al-strip | + | + | — | — | + | — | — |
| of Zn-strip | + | — | — | — | — | — | — |

—: less strong corrosion in the vapour as well as in the liquid phase
—: corrosion in the vapour phase
+: no corrosion

What is claimed is:

1. A stabilized 1,1,1-trichloroethane composition consisting essentially of 1,1,1-trichloroethane, methoxyacetonitrile, nitromethane, 1,4-dioxane and 1,2 epoxybutane wherein said methoxyacetonitrile is present in an amount between 0.01 and 5.0 weight percent, said nitromethane is present in an amount of 0.01 to 2.5 weight percent, said 1,4-dioxane is present in an amount of 0.01 to 4.0 weight percent and said 1,2-epoxybutane is present in an amount of 0.01 to 2.0 weight percent, all based upon the weight of said 1,1,1-trichloroethane.

2. A composition according to claim 1 wherein said methoxyacetonitrile is present in an amount of 0.5 to 3.0 weight percent, said nitromethane is present in an amount of 0.3 to 2.0 weight percent, said 1,4-dioxane is present in an amount of 0.5 to 3.0 weight percent and said 1,2-epoxy butane is present in an amount of 0.2 to 1.0 weight percent, all based upon the weight of said 1,1,1-trichloroethane.

3. A stabilized composition consisting essentially of 1,1,1-trichloroethane, and between 0.2 and 1 weight percent based on the weight of said 1,1,1-trichloroethane of methoxyacetonitrile, 1,2-epoxy butane, nitromethane and 1,4-dioxane, wherein said methoxyacetonitrile, 1,2-epoxy butane, 1,4-dioxane and nitromethane are present in equivalent amounts.

* * * * *